US009919659B2

(12) United States Patent
Kipp et al.

(10) Patent No.: US 9,919,659 B2
(45) Date of Patent: Mar. 20, 2018

(54) ADJUSTABLE MOBILE-DEVICE HOLDER

(71) Applicants: Brian L Kipp, Rochester Hills, MI (US); Omar Cinco, Farmington Hills, MI (US)

(72) Inventors: Brian L Kipp, Rochester Hills, MI (US); Omar Cinco, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 69 days.

(21) Appl. No.: 14/978,375

(22) Filed: Dec. 22, 2015

(65) Prior Publication Data

US 2017/0174146 A1  Jun. 22, 2017

(51) Int. Cl.
*B60R 11/02* (2006.01)
*F16M 13/02* (2006.01)
*B60N 2/22* (2006.01)
*B60R 11/00* (2006.01)
*F16M 11/04* (2006.01)

(52) U.S. Cl.
CPC ............ *B60R 11/02* (2013.01); *B60N 2/2222* (2013.01); *B60R 11/0235* (2013.01); *B60R 2011/0015* (2013.01); *B60R 2011/0071* (2013.01); *B60R 2011/0082* (2013.01); *B60R 2011/0085* (2013.01); *B60R 2011/0089* (2013.01); *F16M 11/041* (2013.01); *F16M 13/02* (2013.01)

(58) Field of Classification Search
None
See application file for complete search history.

(56) References Cited

U.S. PATENT DOCUMENTS

| 4,681,366 | A | * | 7/1987 | Lobanoff | B60N 2/4876 248/475.1 |
| 5,000,511 | A | * | 3/1991 | Shichijo | B64D 11/0015 297/117 |
| 5,267,775 | A | * | 12/1993 | Nguyen | B60N 2/44 248/664 |
| 5,788,202 | A | * | 8/1998 | Richter | B60R 11/0241 224/570 |
| 6,216,927 | B1 | * | 4/2001 | Meritt | B60R 11/02 224/275 |

(Continued)

FOREIGN PATENT DOCUMENTS

CN         202782959       3/2013

*Primary Examiner* — Joshua J Michener
*Assistant Examiner* — Kyle J. Walraed-Sullivan
(74) *Attorney, Agent, or Firm* — Ralph E Smith

(57) ABSTRACT

A vehicle seat may include a seatback, a cover, a housing, arms and a plate. The cover is connected to the seatback at a hinge and is rotatable relative to the seatback between first and second positions to open and close a recess formed in a rearward-facing surface of the seatback. The housing is movably attached to the cover. The arms are movably connected to the housing. Each arm may include a body, a gripping flange extending from an end of the body, and a protrusion extending from the body. The plate is rotatably mounted to the housing and includes a plurality of grooves. Each groove slidably receives a corresponding one of the protrusions such that rotation of the plate in a first direction causes movement of the arms toward each other and rotation of the plate in a second direction causes movement of the arms away from each other.

14 Claims, 9 Drawing Sheets

(56) References Cited

U.S. PATENT DOCUMENTS

| | | | |
|---|---|---|---|
| 7,040,699 B2* | 5/2006 | Curran | B60K 35/00 248/919 |
| 8,203,657 B2* | 6/2012 | Vitito | B60K 35/00 297/217.3 |
| 8,474,778 B2 | 7/2013 | Jacobson | |
| 8,780,282 B2* | 7/2014 | Vitito | B60K 35/00 348/837 |
| 9,114,745 B2* | 8/2015 | Schedivy | B60N 2/4876 |
| 9,161,466 B2* | 10/2015 | Huang | H05K 5/0204 |
| 9,315,157 B2* | 4/2016 | Jahn | B60R 7/043 |
| 9,470,356 B1* | 10/2016 | Zaloom | F16M 11/12 |
| 2005/0204596 A1* | 9/2005 | Peng | G09F 21/04 40/320 |
| 2005/0206206 A1* | 9/2005 | Peng | B60R 11/0235 297/217.3 |
| 2005/0236536 A1* | 10/2005 | Fan | B60R 11/02 248/176.3 |
| 2006/0215836 A1* | 9/2006 | Wang | H04M 1/04 379/455 |
| 2006/0278788 A1* | 12/2006 | Fan | B60R 11/02 248/309.1 |
| 2006/0290654 A1* | 12/2006 | Wang | B60R 11/0235 345/156 |
| 2007/0222248 A1* | 9/2007 | Maulden | B60N 2/4876 296/37.15 |
| 2007/0284500 A1* | 12/2007 | Fan | B60R 11/02 248/346.06 |
| 2008/0169393 A1* | 7/2008 | Wang | B60R 11/02 248/274.1 |
| 2008/0246320 A1* | 10/2008 | Chang | B60R 11/0235 297/217.3 |
| 2008/0252798 A1* | 10/2008 | Vitito | B60K 35/00 348/837 |
| 2009/0008974 A1* | 1/2009 | Hattori | B60N 2/64 297/217.3 |
| 2009/0089841 A1* | 4/2009 | Hanlon | B60R 11/02 725/75 |
| 2009/0174238 A1* | 7/2009 | Kuno | B60N 2/4876 297/217.3 |
| 2009/0225238 A1* | 9/2009 | Vitito | B60R 11/0235 348/837 |
| 2010/0244505 A1* | 9/2010 | Demick | B60N 2/4876 297/188.04 |
| 2010/0259078 A1* | 10/2010 | Saito | B60N 2/4876 297/217.3 |
| 2011/0049943 A1* | 3/2011 | Liu | B60N 2/4876 297/188.04 |
| 2011/0278885 A1* | 11/2011 | Procter | B60R 11/0235 297/135 |
| 2012/0025036 A1* | 2/2012 | Huang | F16M 11/041 248/122.1 |
| 2012/0206867 A1 | 8/2012 | Pence | |
| 2012/0234055 A1* | 9/2012 | Bland, III | E05B 73/0082 70/15 |
| 2012/0235001 A1* | 9/2012 | Somuah | B60R 11/0235 248/287.1 |
| 2012/0246879 A1 | 10/2012 | Pestal et al. | |
| 2012/0267406 A1* | 10/2012 | Fan | B60R 11/02 224/482 |
| 2012/0312847 A1* | 12/2012 | LaColla | B60R 11/02 224/275 |
| 2012/0312936 A1* | 12/2012 | Huang | F16M 11/041 248/122.1 |
| 2013/0015687 A1* | 1/2013 | Kramer | B60N 2/4876 297/217.3 |
| 2013/0043290 A1 | 2/2013 | Prater et al. | |
| 2013/0043369 A1* | 2/2013 | Wheeler | A47F 7/024 248/551 |
| 2013/0148273 A1* | 6/2013 | Tsai | F16M 11/041 361/679.01 |
| 2013/0206942 A1* | 8/2013 | Trotsky | F16M 11/041 248/274.1 |
| 2013/0240587 A1* | 9/2013 | Buchhalter | B60R 11/0241 224/570 |
| 2013/0256478 A1 | 10/2013 | Reda et al. | |
| 2013/0277520 A1* | 10/2013 | Funk | F16M 13/02 248/274.1 |
| 2013/0301216 A1* | 11/2013 | Trinh | A47F 7/0246 361/679.58 |
| 2014/0042285 A1* | 2/2014 | Carnevali | B60R 11/02 248/316.4 |
| 2014/0042781 A1* | 2/2014 | Reeves | B60N 3/004 297/163 |
| 2014/0077539 A1* | 3/2014 | Brawner | B60R 11/02 297/217.3 |
| 2014/0145050 A1* | 5/2014 | Hung | F16M 11/041 248/274.1 |
| 2014/0246551 A1* | 9/2014 | Springer | F16M 11/041 248/276.1 |
| 2014/0263931 A1* | 9/2014 | Chen | F16M 11/041 248/576 |
| 2014/0319083 A1 | 10/2014 | Stark | |
| 2014/0339385 A1* | 11/2014 | Boer | B60R 11/0235 248/222.52 |
| 2015/0034687 A1* | 2/2015 | Terleski | B64D 11/0015 224/275 |
| 2015/0050077 A1* | 2/2015 | Huang | F16B 21/125 403/322.1 |
| 2015/0055278 A1* | 2/2015 | Baschnagel | H04M 1/04 361/679.01 |
| 2015/0060624 A1* | 3/2015 | Huang | H05K 5/0204 248/316.4 |
| 2015/0075356 A1* | 3/2015 | Liu | H04M 1/04 84/625 |
| 2015/0108798 A1* | 4/2015 | Boyer, Jr. | B64D 11/0638 297/163 |
| 2015/0196140 A1* | 7/2015 | Lin | F16M 13/02 248/551 |
| 2015/0285432 A1* | 10/2015 | Johnson | F16M 13/022 248/476 |
| 2015/0300050 A1* | 10/2015 | Van Balen | A47F 7/0246 248/551 |
| 2015/0343957 A1* | 12/2015 | Narayanan | B60R 11/02 224/275 |
| 2016/0044805 A1* | 2/2016 | Fan | B60R 11/02 232/4 R |
| 2016/0108942 A1* | 4/2016 | Yu | F16M 13/00 248/316.4 |
| 2016/0114736 A1* | 4/2016 | Tranchina | B60R 11/0235 348/837 |
| 2016/0143435 A1* | 5/2016 | Kim | B60N 3/004 248/447.1 |
| 2016/0249073 A1* | 8/2016 | Margis | H04N 21/2146 |
| 2016/0264244 A1* | 9/2016 | Matsumoto | F16M 1/00 |
| 2016/0355263 A1* | 12/2016 | Pozzi | B64D 11/00152 |
| 2016/0368431 A1* | 12/2016 | Boer | B60R 11/0235 |
| 2016/0374215 A1* | 12/2016 | Danicich | B60R 11/00 |
| 2017/0088269 A1* | 3/2017 | Matsuda | B64D 11/0638 |
| 2017/0120840 A1* | 5/2017 | Harris | B60R 11/02 |

\* cited by examiner

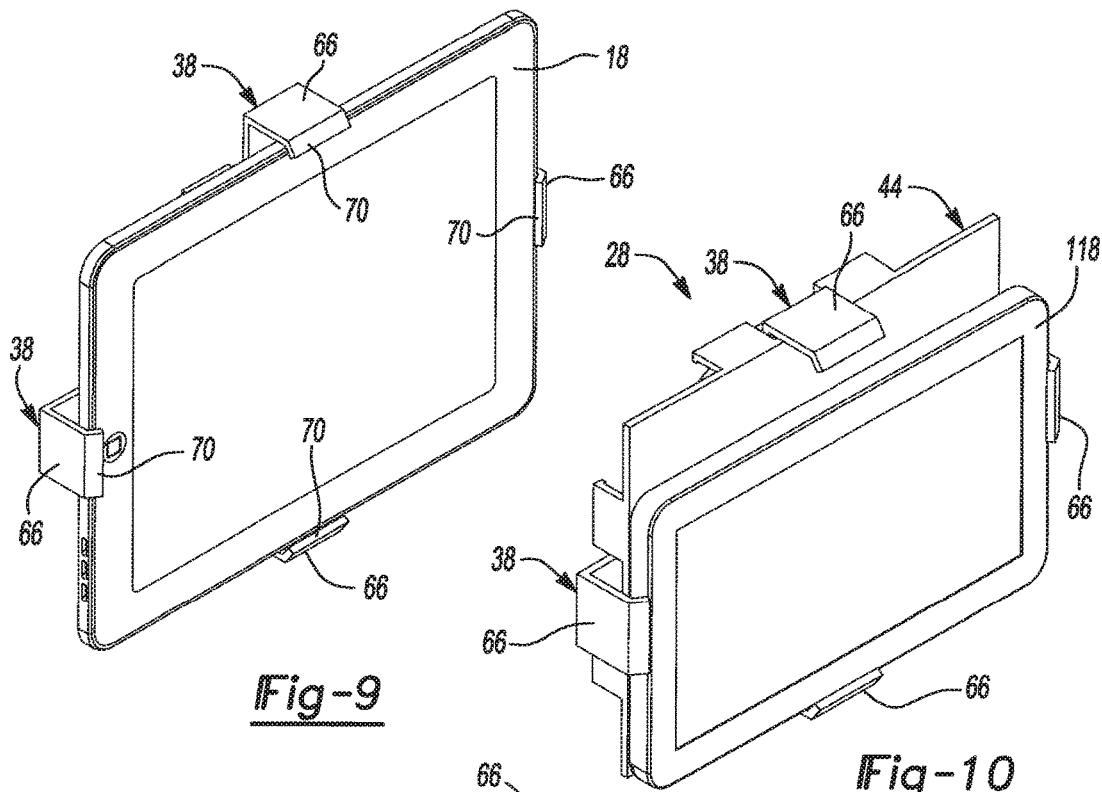
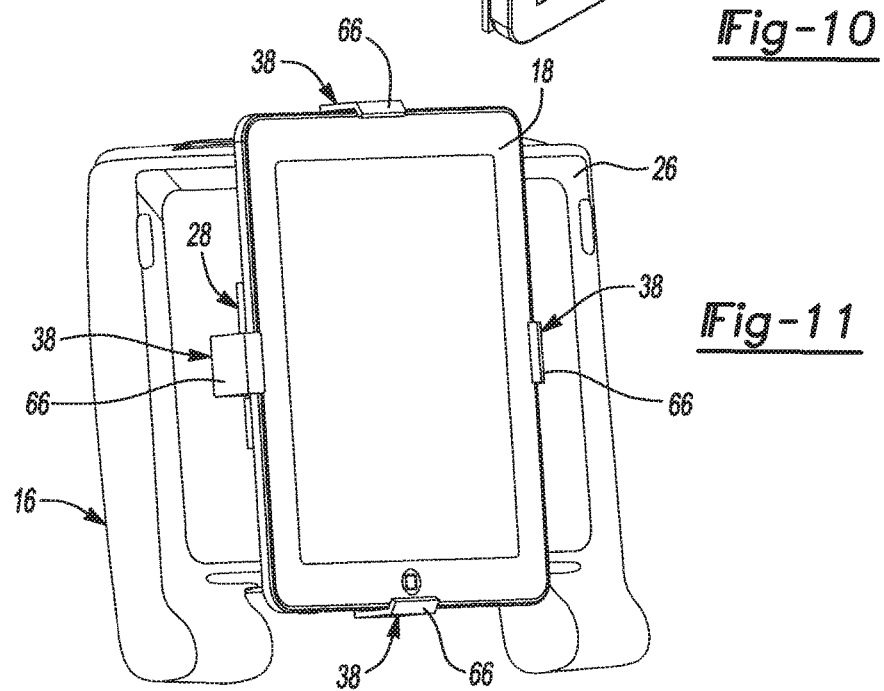

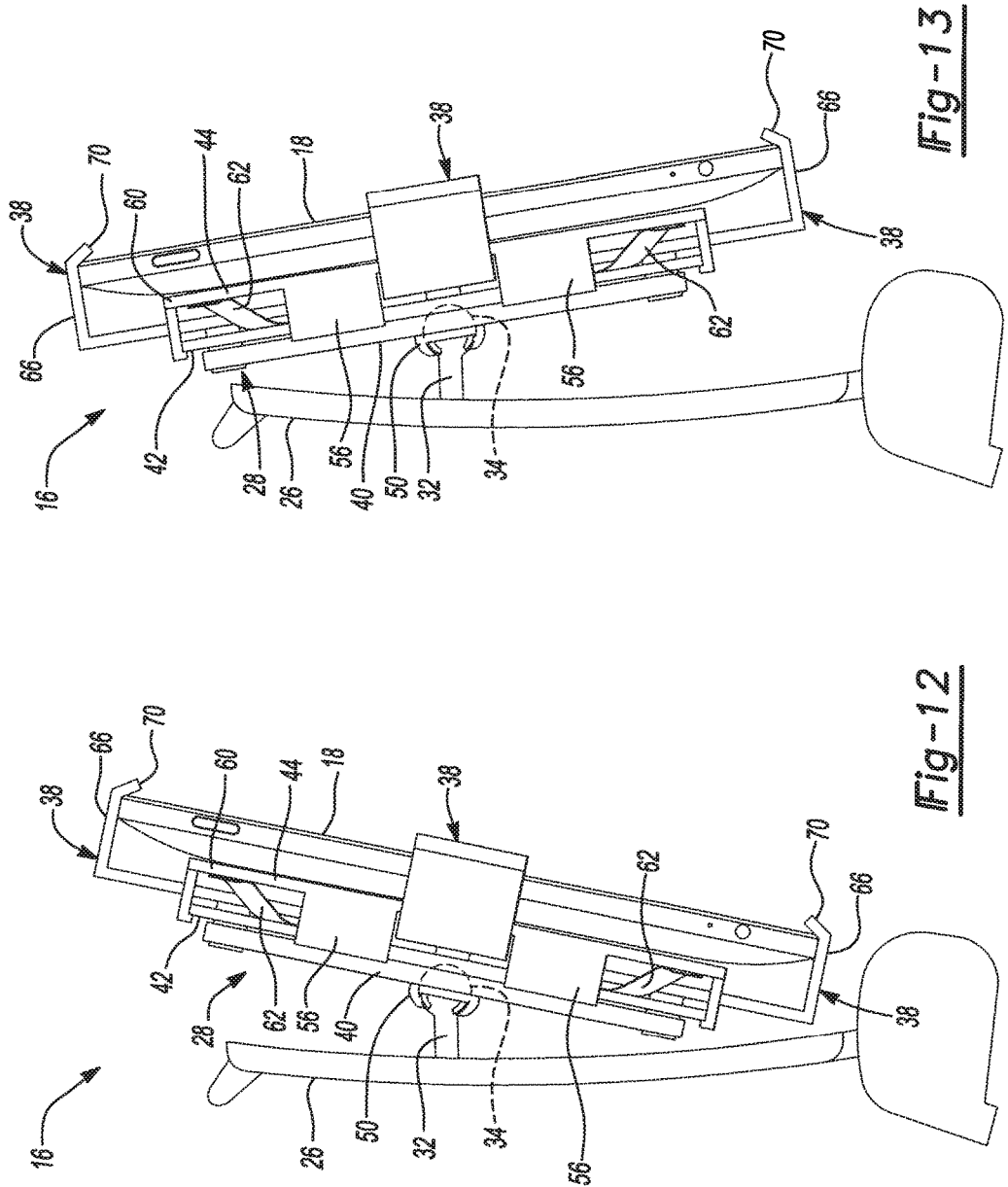

ADJUSTABLE MOBILE-DEVICE HOLDER

FIELD

The present disclosure relates to a vehicle seat having an adjustable mobile-device holder.

BACKGROUND

This section provides background information related to the present disclosure and is not necessarily prior art.

It has become increasingly common for vehicle passengers to view videos and/or other media content on a mobile device (e.g., a tablet computer or an e-reader device) while riding in a vehicle. Brackets have been developed that hold the mobile device in place for hands-free viewing. Such brackets are often cumbersome to use. That is, it can be difficult to manipulate the bracket in order to attach the mobile device to the bracket. Also, mobile devices are often inadequately secured by such conventional brackets, which can result in the mobile device falling out of the bracket while the vehicle is moving. Furthermore, conventional brackets are often aesthetically unpleasing and can be a nuisance to vehicle occupants when the mobile device is not in use. Therefore, the present disclosure provides a mobile-device holder and a vehicle seat that solves the above problems.

SUMMARY

This section provides a general summary of the disclosure, and is not a comprehensive disclosure of its full scope or all of its features.

In one form, the present disclosure provides a vehicle seat that may include a seatback, a cover, a housing, a plurality of arms and a plate. The seatback may include a rearward-facing exterior surface and a recess formed in the rearward-facing exterior surface. The cover may be connected to the seatback at a hinge and may be rotatable relative to the seatback between a stowed position in which the cover closes the recess and a deployed position in which the cover opens the recess. The housing may be movably attached to the cover. The plurality of arms may be movably connected to the housing. Each arm may include a body, a gripping flange extending from an end of the body, and a protrusion extending from the body. The plate may be rotatably mounted to the housing and may include a plurality of grooves. Each of the grooves may slidably receive a corresponding one of the protrusions such that rotation of the plate relative to the housing in a first direction causes corresponding linear movement of the arms toward each other and rotation of the plate relative to the housing in a second direction causes corresponding linear movement of the arms away from each other.

In some configurations, the vehicle seat includes a biasing member rotationally biasing the plate relative to the housing in the first direction.

In some configurations, the housing includes a hub extending outward toward the cover. The plate may include a central aperture that defines a rotational axis and rotatably receives the hub such that the plate rotates about the rotational axis relative to the housing.

In some configurations, the grooves are arranged in a circular pattern around the rotational axis.

In some configurations, the hub includes an aperture that rotationally receives a ball fixed to a stem extending from the cover.

In some configurations, the protrusions extend from the body in a first direction and the gripping flanges extend from the body in a second direction opposite the first direction.

In some configurations, the housing includes a plurality of linearly extending slots that movably receive the protrusions.

In some configurations, a portion of the body of each of the arms is movably disposed in a cavity of the housing. Rotation of the plate in the first direction moves the arms further into the cavity. Rotation of the plate in the second direction moves the arms further out of the cavity.

In some configurations, the plurality of arms include a first arm, a second arm, a third arm and a fourth arm. The first and second arms may be aligned with each other and simultaneously move in opposite directions. The third and fourth arms may be aligned with each other and simultaneously move in opposite directions that are perpendicular to the directions in which the first and second arms move.

In some configurations, the housing includes a first housing member, a second housing member, and a plurality of springs disposed within the cavity between the first and second housing members.

In some configurations, the first housing member is movable relative to the second housing member in a first linear direction toward the second housing member and in a second linear direction away from the second housing member. The springs may bias the first housing member in the second linear direction.

In some configurations, the first and second linear directions are perpendicular to the directions in which the first and second arms move and perpendicular to the directions in which the third and fourth arms move.

In another form, the present disclosure provides a tablet holder that may include a housing, a plurality of arm, a rotating plate and a biasing member. The housing may include a first plate and a second plate defining a cavity therebetween. The first and second plates may be movably attached to each other. The plurality of arms may be movably connected to the housing. Each arm may include a body, a gripping flange extending from an end of the body, and a protrusion extending from the body. A portion of each of the bodies may be movably received in the cavity. The rotating plate may be rotatably mounted to the housing and may include a plurality of grooves arranged in a circular pattern. Each of the grooves may slidably receive a corresponding one of the protrusions such that rotation of the plate relative to the housing in a first direction causes corresponding linear movement of the arms toward each other and further into the cavity and rotation of the plate relative to the housing in a second direction causes corresponding linear movement of the arms away from each other and further out of the cavity. The biasing member may rotationally bias the plate relative to the housing in the first direction.

In some configurations, the second plate includes a hub, and the rotating plate includes a central aperture that defines a rotational axis and rotatably receives the hub such that the rotating plate rotates about the rotational axis relative to the housing.

In some configurations, the protrusions extend from the body in a first direction and the gripping flanges extend from the body in a second direction opposite the first direction.

In some configurations, the housing includes a plurality of linearly extending slots that movably receive the protrusions In some configurations, the plurality of arms include a first arm, a second arm, a third arm and a fourth arm. The first and second arms may be aligned with each other and may simultaneously move in opposite directions. The third and fourth arms may be aligned with each other and may simultaneously move in opposite directions that are perpendicular to the directions in which the first and second arms move.

In some configurations, the housing includes a plurality of springs disposed within the cavity.

In some configurations, the first plate is movable relative to the second plate in a first linear direction toward the second plate and in a second linear direction away from the second plate. The springs may bias the first plate in the second linear direction.

In some configurations, the first and second linear directions are perpendicular to the directions in which the first and second arms move and perpendicular to the directions in which the third and fourth arms move.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DRAWINGS

The drawings described herein are for illustrative purposes only of selected embodiments and not all possible implementations, and are not intended to limit the scope of the present disclosure.

FIG. 9 is a perspective view of the tablet holder holding a first tablet in a first orientation;

FIG. 10 is a perspective view of the tablet holder holding a second tablet in the first orientation;

FIG. 11 is a perspective view of the tablet holder holding the first tablet in a second orientation;

FIG. 12 is a side view of the tablet holder in a first tilted position; and

FIG. 13 is a side view of the tablet holder in a second tilted position.

Corresponding reference numerals indicate corresponding parts throughout the several views of the drawings.

DETAILED DESCRIPTION

Example embodiments will now be described more fully with reference to the accompanying drawings.

Figure 1:
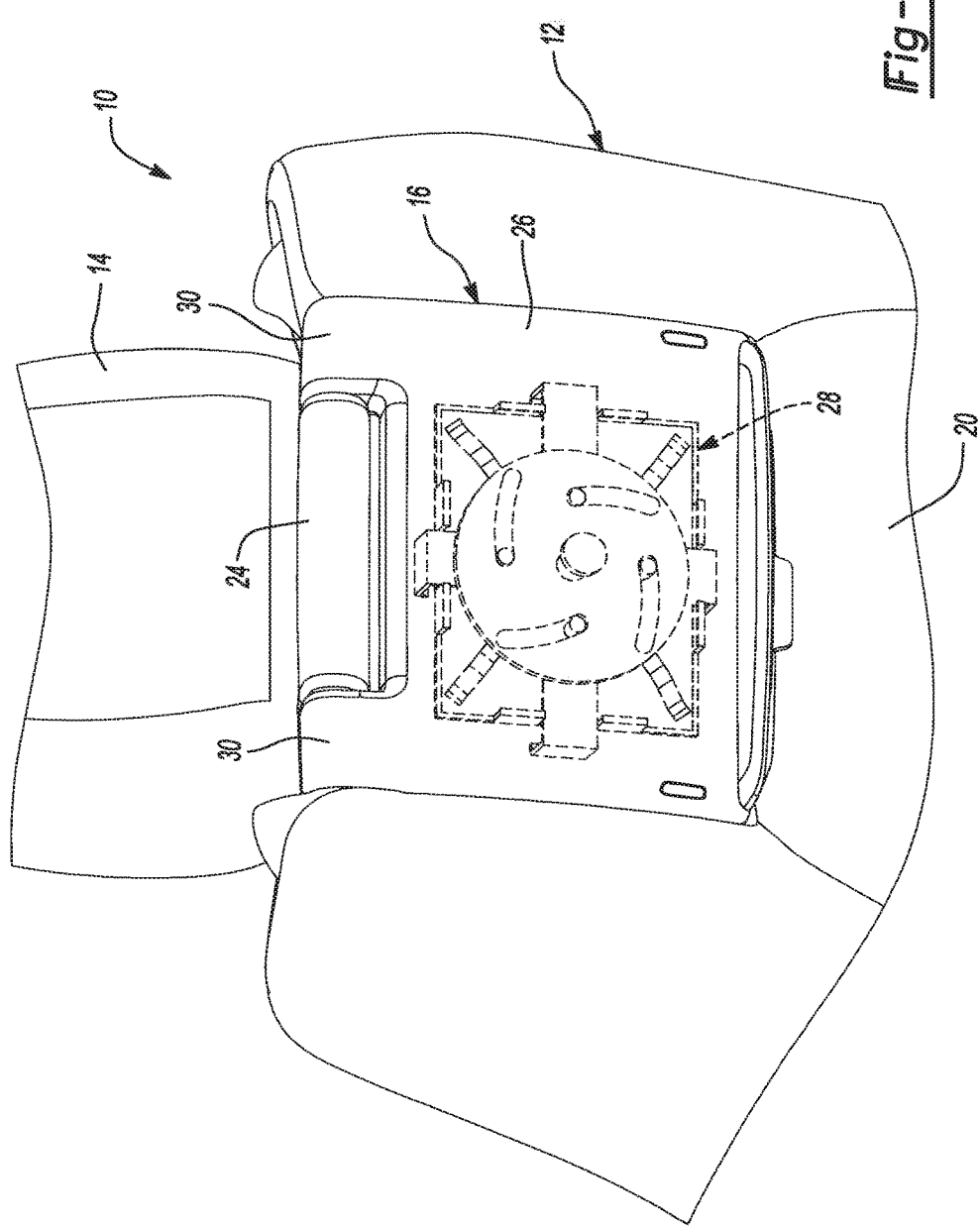
FIG. 1 is a partial perspective view of a vehicle seat having a tablet holder in a closed position according to the principles of the present disclosure.
Figure 2:
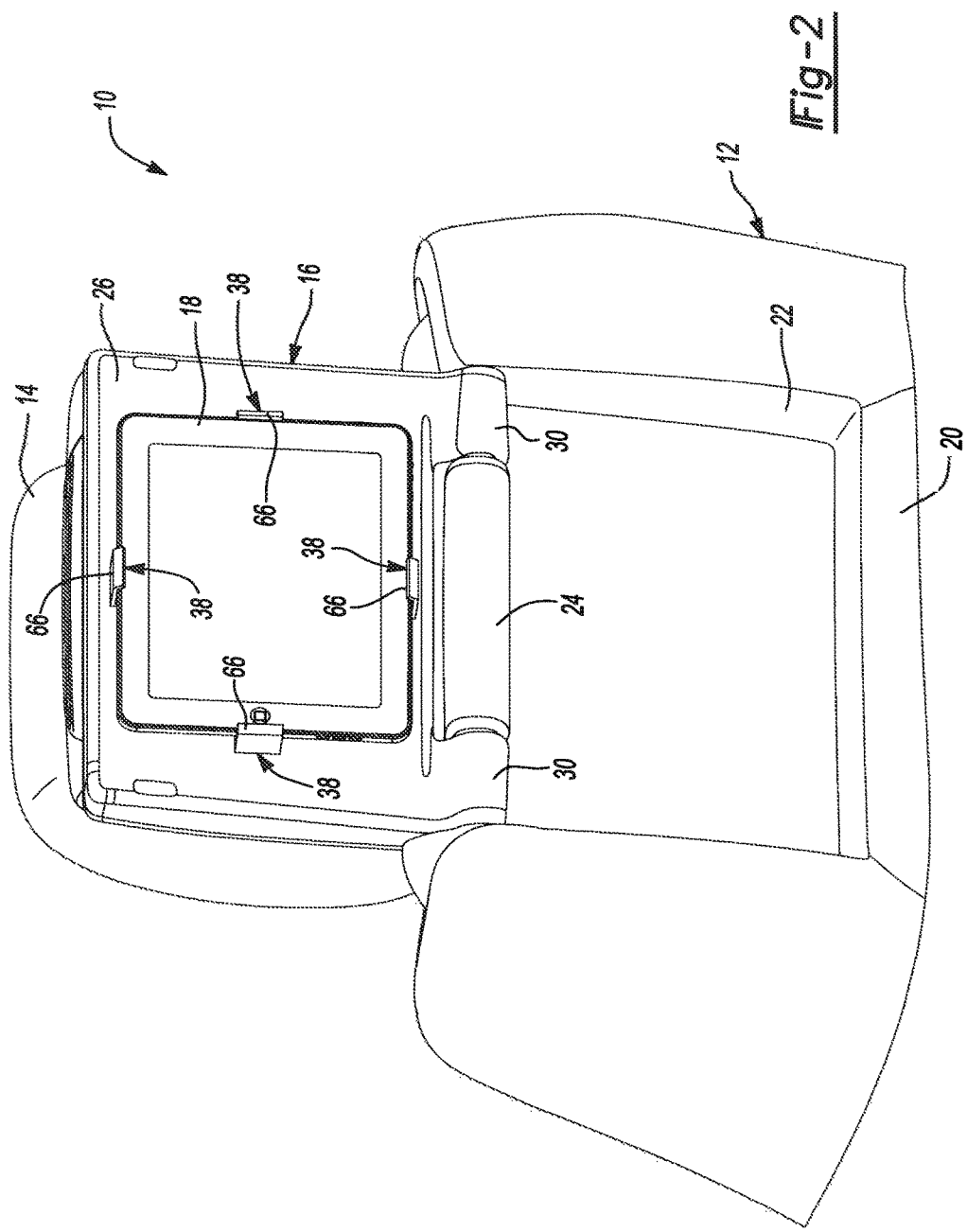
FIG. 2 is a partial perspective view of the vehicle seat with tablet holder in an open position and holding a tablet.
Figure 3:
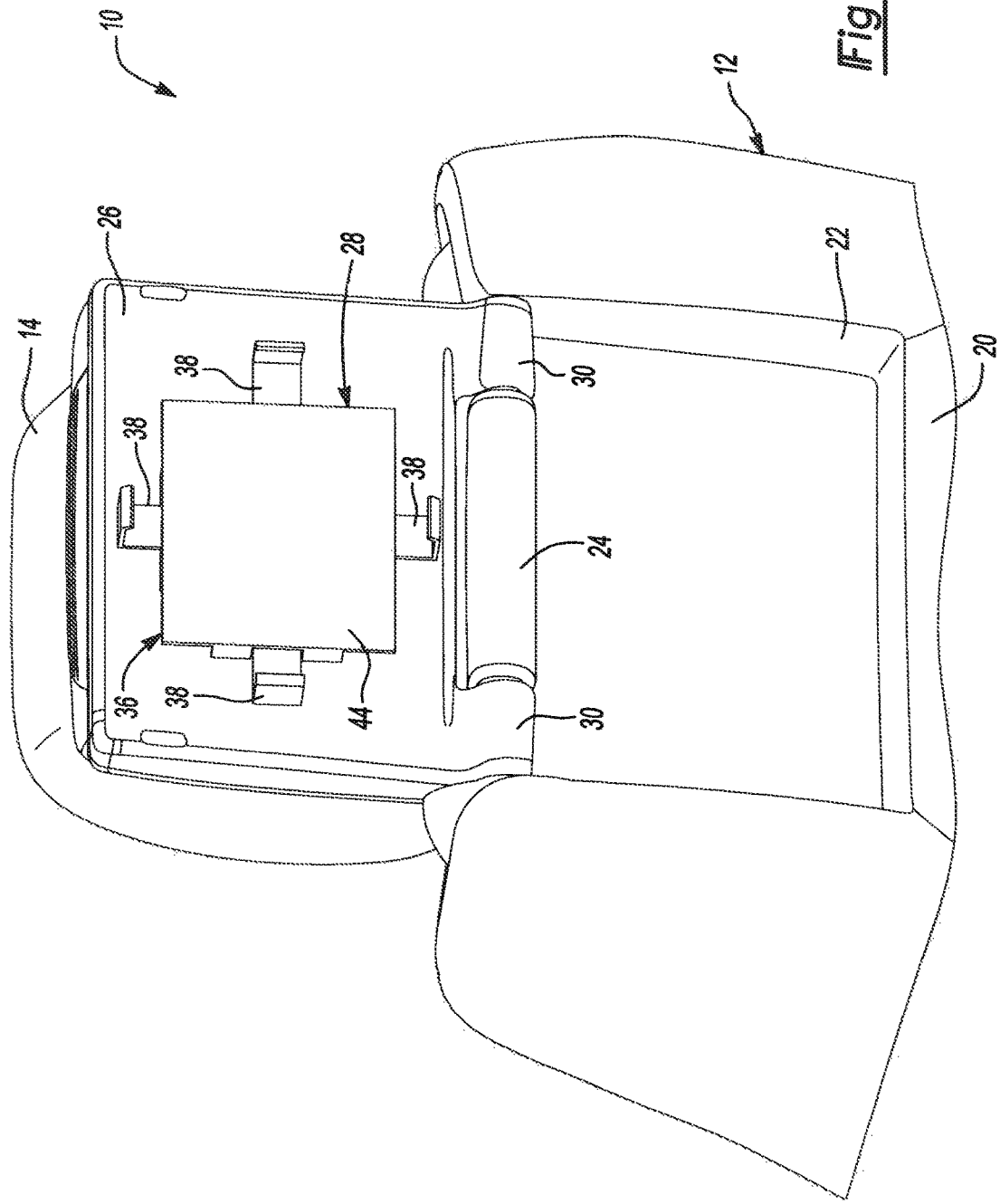
FIG. 3 is a partial perspective view of the vehicle seat with tablet holder in the open position with the tablet removed.

With reference to FIGS. 1-3, a vehicle seat 10 is provided that includes a seat bottom (not shown), a seatback 12, a headrest 14 and a mobile-device holder 16. As shown in FIGS. 1-3, the mobile-device holder 16 can be mounted to the seatback 12 and movable relative thereto between a stowed position (FIG. 1) and a deployed position (FIGS. 2 and 3). In the deployed position, the mobile-device holder 16 can removably retain a mobile device 18 (e.g., a tablet computer, an e-reader device or any other mobile device) (FIG. 2) in a position so that one or more vehicle passengers seated in a seat behind the seat 10 can view the screen of the mobile device 18. As will be described in more detail below, the mobile-device holder 16 can retain mobile devices of a variety of sizes and can be adjusted to position the mobile device according to suit a viewer's preferences.

A shown in FIGS. 1-3, the seatback 12 may include a rear-facing surface 20 (i.e., a surface facing away from a backrest surface against which an a person seated in the seat 10 would rest his or her back) having a recess 22 (FIGS. 2 and 3) formed therein. A first hinge portion 24 may be connected to or integrally formed with the seatback 12 at an upper end of the recess 22. As shown in FIG. 1, the mobile-device holder 16 may be at least partially received in the recess 22 in the stowed position.

Figure 4:
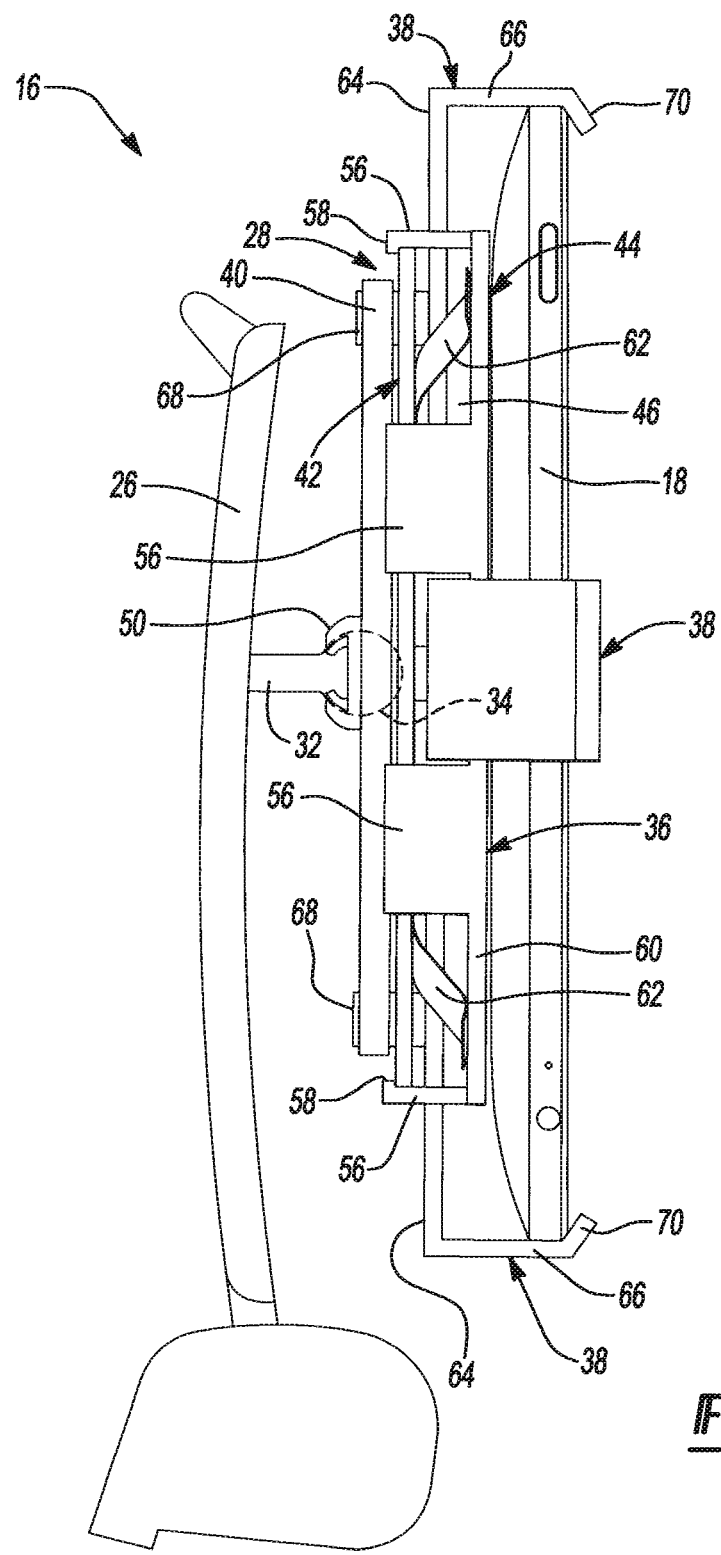
FIG. 4 is a side view of the tablet holder in the open position.

As shown in FIGS. 1-4, the mobile-device holder 16 may include a cover 26 and a bracket assembly 28. The cover 26 may include second and third hinge portions 30 that rotatably engage the first hinge portion 24 of the seatback 12 so that the cover 26 can rotate relative to the seatback 12 between the stowed and deployed positions. The cover 26 may also include a peg or stem 32 (FIG. 4) extending therefrom. The stem 32 may have a generally spherical tip 34 that can be movably received in the bracket assembly 28, as shown in FIG. 4.

Figure 6:
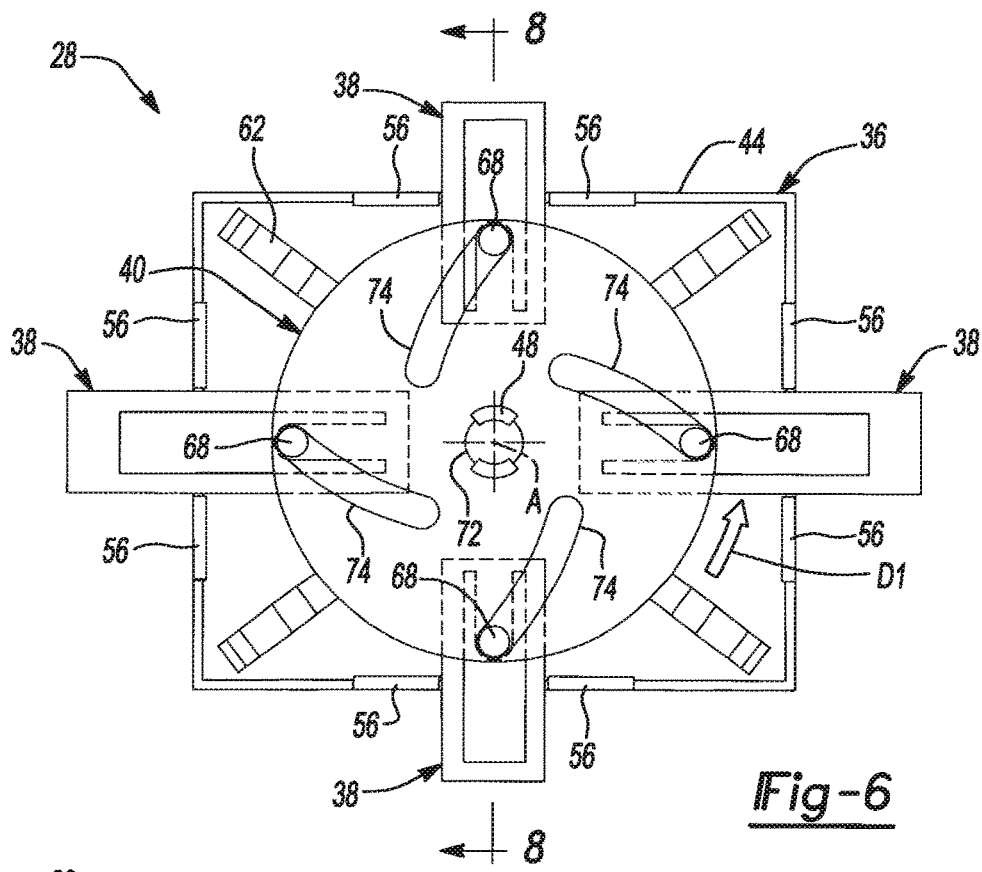
FIG. 6 is a rear view of a portion of the tablet holder with arms in an extended position.
Figure 7:
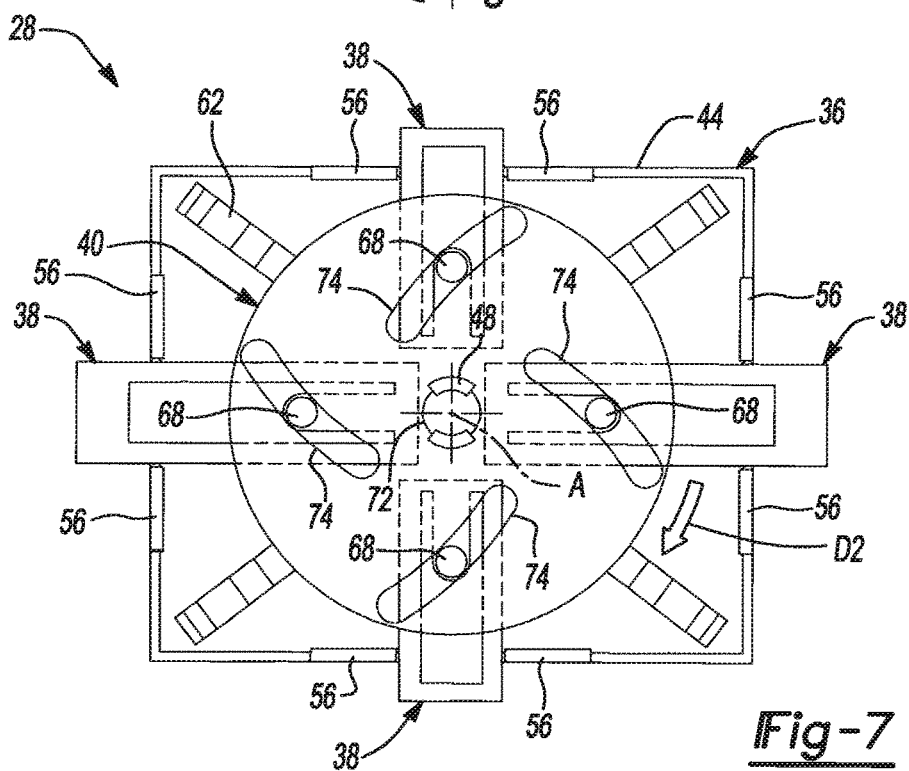
FIG. 7 is a rear view of a portion of the tablet holder with arms in a retracted position.
Figure 8:
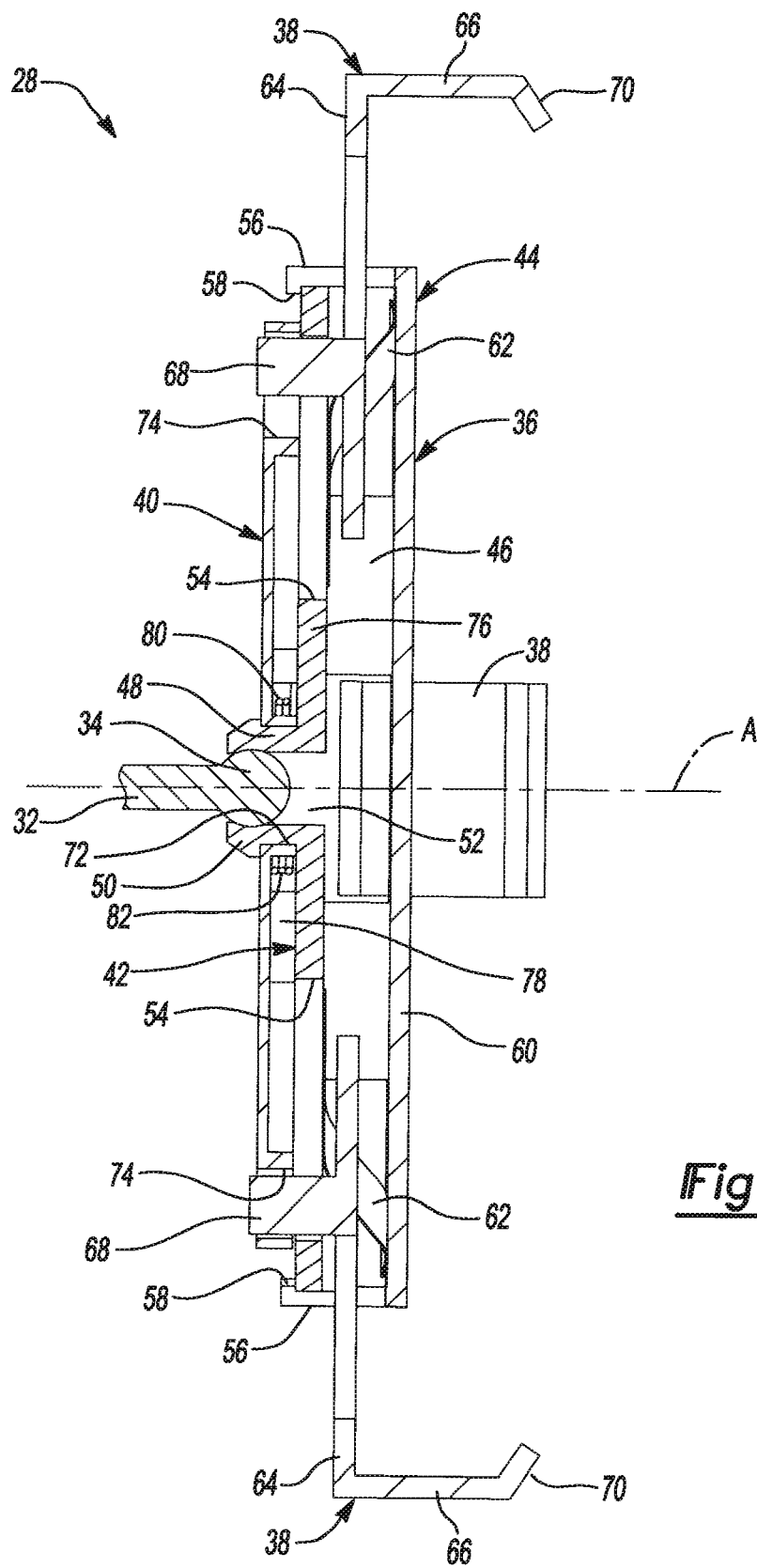
FIG. 8 is a partial cross-sectional view of the tablet holder taken along line 8-8 of FIG. 6.

As shown in FIGS. 5-8, the bracket assembly 28 may include a housing 36, a plurality of arms 38 and a rotating plate 40 (FIG. 8). The housing 36 may include a base plate 42 and an adjustable plate 44 that are movably engaged with each other and cooperate to define a cavity 46 (FIG. 8) therebetween. The base plate 42 may include a hub 48 (FIGS. 5 and 8) that extends toward the cover 26 (i.e., away from the adjustable plate 44) and has a distal end with one or more barbs 50. An aperture 52 may extend through the hub 48 and may pivotably receive the spherical tip 34 of the stem 32 of the cover 26. The base plate 42 may also include a plurality of slots 54 that extend through the thickness of the base plate 42. The slots 54 are arranged around the hub 48 in a cross-shaped pattern. Each of the slots 54 corresponds to a respective one of the arms 38.

Figure 5:
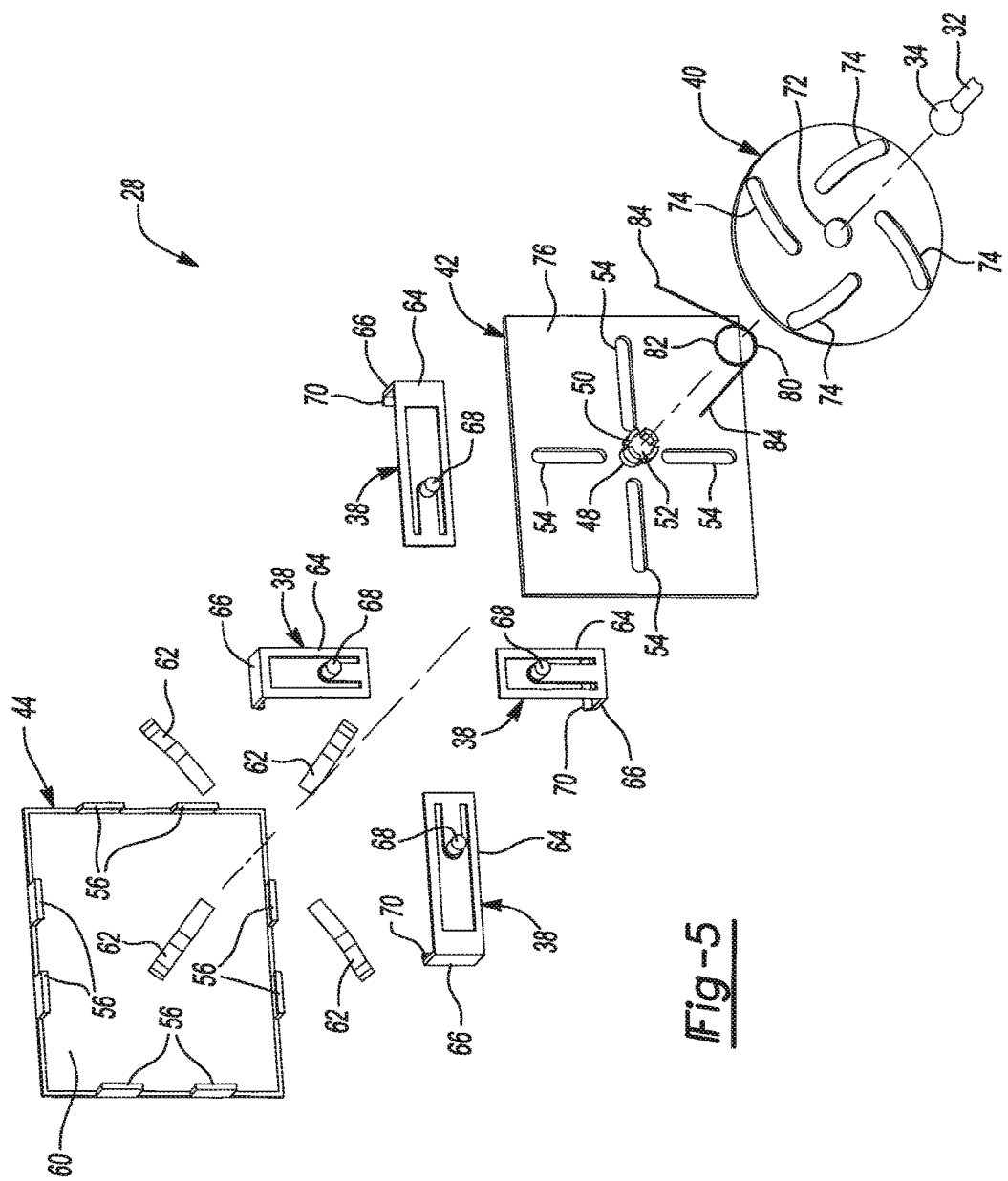
FIG. 5 is an exploded perspective view of a portion of the tablet holder.

As shown in FIGS. 5 and 8, the adjustable plate 44 may include four pairs of latch arms 56 that extend outward and movably engage the base plate 42. As shown in FIG. 8, distal ends of the latch arms 56 may include barbs 58 that retain the base plate 42 between the barbs 58 and a main body 60 of the adjustable plate 44 while still allowing relative movement between the base plate 42 and the adjustable plate 44.

As shown in FIGS. 4, 5 and 8, a plurality of springs 62 may be disposed within the cavity 46 between the base plate 42 and the adjustable plate 44. The springs 62 bias the plates 42, 44 away from each other, but the springs 62 can be compressed to allow the main body 60 of the adjustable plate 44 to move linearly toward the base plate 42. That is, the adjustable plate 44 can move toward and away from the base plate 42 in directions that decrease and increase the volume of the cavity 46.

As shown in FIGS. 4-8, each of the arms 38 may include a main body 64, a gripping flange 66 extending from an end of the main body 64, and a peg or protrusion 68 extending from the main body 64. As shown in FIGS. 4 and 8, at least a portion of the main body 64 is disposed within the cavity 46 between the plates 42, 44. The main body 64 of each arm 38 may slidably engage the base plate 42 such that the protrusion 68 of each arm 38 extends through and is movably received within a corresponding one of the slots 54 in the base plate 42. Further, as shown in FIGS. 6 and 7, the main body 64 of each arm 38 may be movably received between corresponding adjacent latch arms 56. In this manner, the arms 38 are movable in linear directions toward and away from a rotational axis A (FIG. 8) of the rotating plate 40 (i.e., toward and away from the hub 48) along the longitudinal axes of the slots 54.

The gripping flange 66 of each arm 38 may extend in a direction perpendicular to the main body 64 (parallel to the rotational axis A of the rotating plate 40). As shown in FIGS. 4 and 8, distal ends 70 of the gripping flanges 66 may be angled relative to the main bodies 64 and the rotational axis A such that the distal ends 70 extend generally toward the rotational axis A.

The rotating plate 40 can be generally disk-shaped member having a central aperture 72 and a plurality of arcuate slots 74 arranged in a circular pattern around the central aperture 72. The rotating plate 40 may rotatably engage the base plate 42. As shown in FIG. 8, the central aperture 72 may rotatably receive the hub 48 such that the rotating plate is disposed between the barbs 50 and a main body 76 of the base plate 42. In this manner, the barbs 50 allow the rotating plate 40 to be snap-fit onto the hub 48. As shown in FIG. 8, the rotating plate 40 may include a recess 78 that may receive a torsion spring 80. The torsion spring 80 may include a coiled portion 82 (FIG. 5) disposed around the hub 48 and a pair of legs 84 (FIG. 5) attached the rotating plate 40 and the base plate 42 to rotationally bias the rotating plate 40 relative to the base plate 42.

Each of the arcuate slots 74 of the rotating plate 40 may slidably receive the protrusion 68 of a corresponding one of the arms 38. The arcuate slots 74 are shaped such that the arcuate slots 74 extend outward toward an outer periphery of the rotating plate 40 as they curve in a generally clockwise direction (relative to the frame of reference of FIGS. 6 and 7). In this manner, rotation of the rotating plate 40 relative to the housing 36 in a counterclockwise direction D1 (FIG. 6) causes all of the arms 38 to simultaneously move relative to the housing 36 in respective linearly outward directions away from each other (i.e., away from the rotational axis A). Rotation of the rotating plate 40 relative to the housing 36 in a clockwise direction D2 (FIG. 7) causes all of the arms 38 to simultaneously retract into the housing 36 in respective linearly inward directions toward each other (i.e., toward the rotational axis A) toward a retracted position. The torsion spring 80 biases the rotating plate in the clockwise direction D2.

With continued reference to FIGS. 1-13, operation of the mobile-device holder 16 will be described in detail. As described above, the mobile-device holder 16 can removably retain the mobile device 18 in a selected position so that one or more vehicle passengers seated in a seat behind the seat 10 can view the screen of the mobile device 18.

A user (i.e., a person) can attach the mobile device 18 to the bracket assembly 28 either while the bracket assembly 28 is attached to the cover 26 and the cover 26 is in the deployed position (FIG. 2) or while the bracket assembly 28 is detached from the cover 26. The user can attach the mobile device 18 to the bracket assembly 28 by rotating the rotating plate 40 in the direction D1 relative to the housing 36 to spread the gripping flanges 66 of the arms 38 apart from each other, as shown in FIG. 6. With the gripping flanges 66 sufficiently spread apart, the user may place the back of the mobile device 18 (i.e., the side of the mobile device 18 opposite the screen) against the main body 60 of the adjustable plate 44. Then, the user can release the rotating plate 40 to allow the spring 80 to urge the rotating plate 40 in the direction D2 to clamp the mobile device 18 between the two pairs of opposing gripping flanges 66, as shown in FIGS. 2, 4, 12 and 13. Furthermore, the biasing force of the springs 62 will urge the adjustable plate away from the base plate 42 to clamp the mobile device 18 between the main body 60 of the adjustable plate 44 and the angled distal ends 70 of the gripping flanges 66. In this manner, the mobile device 18 can be securely retained to the bracket assembly 28 in a manner that reduces or eliminates any unintentional movement of the mobile device 18 relative to the bracket assembly 28. To remove the mobile device 18 from the bracket assembly 28, the user can rotate the rotating wheel in the direction D1 to spread the gripping flanges 66 apart to release the clamping force on the mobile device 18.

The structure and function of the bracket assembly 28 allows mobile devices of various sizes to be securely retained by the gripping flanges 66. Some smaller mobile devices, such as the mobile device 118 shown in FIG. 10, may be retained by only three of the gripping flanges 66 rather than by all four of the gripping flanges 66. Still other mobile devices, such as a smartphone (not shown), could be retained by two of the gripping flanges 66.

The user can attach the bracket assembly 28 to the cover 26 (with or without the mobile device 18 attached to the bracket assembly 28) by snapping or pressing the spherical tip 34 of the stem 32 of the cover 26 into the aperture 52 in the hub 48 of the base plate 42. With the spherical tip 34 received in the aperture 52, the bracket assembly 28 can be tilted (i.e., to adjust pitch and/or yaw) (see FIGS. 12 and 13) and/or rotated (i.e., rolled about rotational axis A to place the mobile device in portrait or landscape orientation) (see FIGS. 9 and 11) in any desired direction to position the screen of the mobile device 18 in the user's preferred viewing position.

While the bracket assembly 28 is shown in the figures conjunction with the cover 26 and the seat 10, it will be appreciated that the bracket assembly 20 could be mounted to or configured to be mounted to any other structure (with or without the cover 26). In other words, the mobile-device holder 16 need not necessarily include the cover 26.

What is claimed is:

1. A vehicle seat comprising:
a seatback having a rearward-facing exterior surface and a recess formed in the rearward-facing exterior surface;
a cover connected to the seatback at a hinge and rotatable relative to the seatback between a stowed position in which the cover closes the recess and deployed position in which the cover opens the recess;
a housing movably attached to the cover;
a plurality of arms movably connected to the housing, each arm including a body, a gripping flange extending from an end of the body, and a protrusion extending from the body; and
a plate rotatably mounted to the housing and including a plurality of elongated arcuate slots, each of the plurality of elongated arcuate slots slidably receiving a corresponding one of the protrusions such that rotation of the plate relative to the housing in a first direction causes corresponding linear movement of the plurality of arms toward each other and rotation of the plate relative to the housing in a second direction causes corresponding linear movement of the plurality of arms away from each other, wherein each protrusion is received in a corresponding one of the elongated arcuate slots throughout the entire range of linear movement of the plurality of arms.

2. The vehicle seat of claim 1, further comprising a biasing member rotationally biasing the plate relative to the housing in the first direction.

3. The vehicle seat of claim 1, wherein the housing includes a hub extending outward toward the cover, and wherein the plate includes a central aperture that defines a rotational axis and rotatably receives the hub such that the plate rotates about the rotational axis relative to the housing.

4. The vehicle seat of claim 3, wherein the plurality of elongated arcuate slots are arranged in a circular pattern around the rotational axis.

5. The vehicle seat of claim 4, wherein the hub includes an aperture that rotationally receives a ball fixed to a stem extending from the cover.

6. The vehicle seat of claim 1, wherein the protrusions extend from the body in a first direction and the gripping flanges extend from the body in a second direction opposite the first direction.

7. The vehicle seat of claim 1, wherein the housing includes a plurality of elongated linearly extending slots that movably receive the protrusions.

8. The vehicle seat of claim 1, wherein a portion of the body of each of the plurality of arms is movably disposed in a cavity of the housing, wherein rotation of the plate in the first direction moves the plurality of arms further into the cavity, and wherein rotation of the plate in the second direction moves the plurality of arms further out of the cavity.

9. The vehicle seat of claim 8, wherein the plurality of arms include a first arm, a second arm, a third arm and a fourth arm, and wherein the first and second arms are aligned with each other and simultaneously move in opposite directions, and wherein the third and fourth arms are aligned with each other and simultaneously move in opposite directions that are perpendicular to the directions in which the first and second arms move.

10. The vehicle seat of claim 9, wherein the housing includes an adjustable plate, a base plate, and a plurality of springs disposed within the cavity between the base plate and the adjustable plate.

11. The vehicle seat of claim 10, wherein the adjustable plate is movable relative to the base plate in a first linear direction toward the base plate and in a second linear direction away from the base plate, the springs biasing the adjustable plate in the second linear direction.

12. The vehicle seat of claim 11, wherein the first and second linear directions are perpendicular to the directions in which the first and second arms move and perpendicular to the directions in which the third and fourth arms move.

13. A vehicle seat comprising:
a seatback having a rearward-facing exterior surface and a recess formed in the rearward-facing exterior surface;
a cover connected to the seatback at a hinge and rotatable relative to the seatback between a stowed position in which the cover closes the recess and a deployed position in which the cover opens the recess;
a housing movably attached to the cover and including an adjustable plate, a base plate, and a plurality of springs disposed between and contacting the base plate and the adjustable plate;
a plurality of arms movably connected to the housing, each arm including a body, a gripping flange extending from an end of the body, and a protrusion extending from the body; and
a rotatable plate rotatably mounted to the housing such that the base plate is disposed between the rotatable plate and the adjustable plate, the rotatable plate including a plurality of elongated arcuate slots, each of the plurality of elongated arcuate slots slidably receiving a corresponding one of the protrusions such that rotation of the rotatable plate relative to the housing in a first direction causes corresponding linear movement of the plurality of arms toward each other and rotation of the rotatable plate relative to the housing in a second direction causes corresponding linear movement of the plurality of arms away from each other,
wherein the adjustable plate is movable relative to the base plate in a first linear direction toward the base plate and in a second linear direction away from the base plate, the springs biasing the adjustable plate in the second linear direction, wherein the first and second linear directions are perpendicular to the directions in which the plurality of arms are moveable.

14. The vehicle seat of claim 13, wherein the base plate includes a plurality of elongated linearly extending slots that movably receive the protrusions.

* * * * *